(12) United States Patent
Melody et al.

(10) Patent No.: US 6,183,618 B1
(45) Date of Patent: Feb. 6, 2001

(54) PROCESS FOR TREATING IMPREGNATED ELECTROLYTIC CAPACITOR ANODES

(75) Inventors: Brian J. Melody, Greer; John T. Kinard, Simpsonville; David A. Wheeler, Williamston, all of SC (US)

(73) Assignee: Kemet Electronics Corporation, Greenville, SC (US)

(*) Notice: Under 35 U.S.C. 154(b), the term of this patent shall be extended for 0 days.

(21) Appl. No.: 09/241,604

(22) Filed: Feb. 2, 1999

(51) Int. Cl.$^7$ .......................................... C25D 5/02
(52) U.S. Cl. ................... 205/115; 205/150; 205/171; 205/175; 205/318; 205/322; 205/332
(58) Field of Search ................... 205/115, 150, 205/171, 175, 318, 322, 332

(56) References Cited

U.S. PATENT DOCUMENTS

| | | |
|---|---|---|
| 3,180,809 | 4/1965 | Gregori . |
| 3,359,191 | 12/1967 | Minami et al. . |
| 3,496,424 | 2/1970 | Behrend . |
| 3,563,863 | 2/1971 | Vierow . |
| 3,796,644 | 3/1974 | Bernard . |
| 3,943,041 | 3/1976 | Jackson . |
| 4,196,060 | 4/1980 | Patrie et al. . |
| 4,383,897 | 5/1983 | Gillich et al. . |
| 4,388,156 | 6/1983 | Gillich et al. . |
| 4,476,517 | 10/1984 | Fresia . |
| 4,479,156 | 10/1984 | Finkelstein et al. . |
| 4,781,802 | 11/1988 | Fresia . |
| 4,823,236 | 4/1989 | Fresia . |
| 5,111,365 | 5/1992 | Dapo . |
| 5,211,741 | 5/1993 | Fife . |
| 5,385,662 | 1/1995 | Kurze et al. . |
| 5,560,761 | 10/1996 | Naito . |
| 5,580,367 | 12/1996 | Fife . |
| 5,587,871 | 12/1996 | Ue et al. . |
| 5,605,561 | 2/1997 | Iwabuchi et al. . |
| 5,687,057 | 11/1997 | Dapo . |
| 5,837,121 | 11/1998 | Kinard et al. . |

FOREIGN PATENT DOCUMENTS

| | | |
|---|---|---|
| 537474 | 6/1941 | (GB) . |
| 1 269 010 | 3/1972 | (GB) . |
| 1 395 070 | 5/1975 | (GB) . |
| 3-119713 | 5/1991 | (JP) . |

OTHER PUBLICATIONS

PCT/US00/00452 International Search Report dated Jun. 15, 2000.
DE 3328049, Feb. 21, 1985, Abstract.*

* cited by examiner

*Primary Examiner*—Kathryn Gorgos
*Assistant Examiner*—Christopher M. Keehan
(74) *Attorney, Agent, or Firm*—Banner & Witcoff, Ltd.

(57) ABSTRACT

A process for treating an impregnated electrolytic capacitor anode whereby the anode body is immersed in a liquid electrolytic solution and a voltage is applied to the anode body, whereby a current flows through and repairs flaw sites in the anode body. The liquid electrolytic solution includes an organic solvent comprising at least one of polyethylene glycol, polyethylene glycol monomethyl ether, and polyethylene glycol dimethyl ether. Alternatively, the electrolytic solution includes an organic solvent and an alkali metal phosphate salt. Preferably, the electrolytic solution contains both an alkali metal phosphate salt and an organic solvent comprising at least one of polyethylene glycol, polyethylene glycol monomethyl ether, and polyethylene glycol dimethyl ether.

16 Claims, 17 Drawing Sheets

PROCESS FOR TREATING IMPREGNATED ELECTROLYTIC CAPACITOR ANODES

FIELD OF THE INVENTION

The present invention is directed to contamination-resistant reformation electrolytes and more particularly to a process for treating impregnated electrolytic capacitor anodes.

BACKGROUND OF THE INVENTION

Electrolytic capacitors are generally the capacitors of choice for applications demanding high capacitance/size and high capacitance/cost ratios. These devices exploit the relatively high dielectric constants and very high withstanding voltages per unit thickness which may be obtained in the anodic oxide films grown upon valve metals with appropriate electrolytes and anodizing conditions.

Aluminum is typically employed as the valve metal in electrolytic capacitors where low cost per unit capacitance is a primary concern, while tantalum is usually employed for applications in which high reliability and volumetric efficiency (i.e., high capacitance per unit volume) are the primary concerns. Other valve metals, including niobium, titanium, and titanium aluminides have also been used to construct capacitors, but aluminum and tantalum remain the main materials of choice. The valve metal may be utilized in the form of an etched foil or as a porous, sintered powder-metallurgy compact at significantly below theoretical density. In either form, the valve metal is anodized to produce the anodic dielectric film prior to application of the cathode material.

Electrolytic capacitors may be classified by the type of cathode material employed in their construction. So-called "wet" capacitors contain aluminum or other valve metal foil immersed in a container of liquid electrolyte. Although these devices were once commonplace, their low volumetric efficiency has rendered them obsolete. "Wet slug" tantalum capacitors in which sintered, powder metallurgy, anodized tantalum anodes are immersed in a minimum volume of highly conductive liquid electrolyte (e.g. 40% sulfuric acid) find application where high volumetric efficiency and capacitance combined with high reliability are desired. These devices tend to have relatively high ESR due to the resistivity inherent in ionically conductive liquids. In the event of seal failure, the acid and concentrated salt electrolytes employed in their construction tend to be very corrosive to circuit boards and other components.

So-called "dry" electrolytic capacitors were developed to increase the volumetric efficiency of "wet" aluminum capacitors while avoiding the highly corrosive electrolytes and additional expense associated with "Wet slug" tantalum capacitors. This type of capacitor has one or more anode and cathode foils separated by highly absorbent paper. The foil/paper combination is wound to form a cylinder having protruding tabs for electrical connection, and this cylinder assembly is then impregnated with a liquid electrolyte prior to assembly into a case which surrounds the impregnated assembly.

The "wet," "wet slug," and "dry" capacitor constructions all have in common the presence of a liquid electrolyte in contact with the valve metal anode. Any cracks or defects in the anodic oxide (due to the capacitor assembly process, etc.) may be at least partially healed during use by the application of voltage, which results in the growth of fresh anodic oxide or the isolation of flaws by the presence of gas bubbles from electrolysis of the electrolyte.

In the 1950's, a new type of electrolytic capacitor was introduced in which the cathode material is a true "solid" These devices usually contain a sintered, powder metallurgy anodized tantalum anode which has been impregnated with manganese dioxide via pyrolysis of manganese nitrate solution. More recently, "solid" electrolytic capacitors have been introduced which employ intrinsically conductive polymers, such as polypyrrole, polythiophenes, etc., as the cathode materials.

The introduction of conductive polymer cathode materials has facilitated the use of aluminum and other valve metals in addition to tantalum in "solid" capacitors due to the elimination of the multiple pyrolysis steps at the relatively high temperatures (200–400° C.) required to produce manganese dioxide cathode material within the pore structures of anodes after first impregnating the anode bodies with manganese nitrate solution.

The construction of "solid" electrolytic capacitors eliminates the contact to the anodic oxide by a liquid electrolyte. The absence of a liquid electrolyte minimizes the amount of dielectric flaw "healing" or isolation which can be accomplished in the finished device due to extreme heating of the oxide at flaw sites brought about by the higher currents supported by manganese dioxide or conductive polymers compared with the more resistive liquid electrolytes. The elimination of liquid electrolyte also minimizes the heat sink action of the cathode material at flaw sites (localized boiling of liquid electrolyte tends to carry heat away from flaw sites).

In order to overcome the difficulty of repairing flaws in the anodic oxide dielectric of assembled "solid" electrolytic capacitors, one or more electrolytic treatment steps (known as "reformation" or, simply, "reform" steps; the initial anodization which produces the anodic oxide is known as the "formation" step(s)) are carried out in which the anode bodies containing manganese dioxide or conductive polymeric material are immersed in a liquid electrolyte and a positive voltage is applied to the anode bodies while a negative voltage is applied to the electrolyte. The voltage applied to the anodes is generally lower than that used to produce the anodic oxide, so that the vast majority of any current flowing through the anode bodies flows through the flaw sites. This current flow is thought to repair the flaws by the growth of new oxide at the flaw or, especially, by thermally and electrochemically degrading the cathode material locally, thereby isolating the flaw sites electrically. Reformation electrolytes generally contain a small amount of phosphoric acid as the ionogen. Although many other ionogens have been employed in "reform" electrolytes including sulfuric acid, nitric acid, acetic acid, and sulfosalicylic acid, the presence of the orthophosphate ion has generally been found to give the best results with respect to the leakage current of the finished devices.

As stated above, the liquid electrolyte used for reformation serves as a heat sink to prevent run-away heating at flaws and the resistivity of the electrolyte serves to act as a resistor in series with each capacitor anode, limiting the current and the resulting current-driven heating of the flaws during the reform process.

Due to the current-limiting aspect of the reform electrolyte the resistivity of this electrolyte is usually carefully controlled. The optimal resistivity range for reform electrolytes depends upon the applied voltage, electrolyte temperature, and the chemical nature of the cathode material involved. What is generally desirable, however, is minimal resistivity change during use.

Unfortunately, anodes which have been impregnated with solid cathode materials frequently contain ionic materials which leach into the reformation electrolyte during the reformation step(s). Manganese dioxide containing anodes tend to contain nitrogen oxides adsorbed on the high surface area manganese dioxide, as well as a small amount of unreacted manganese nitrate. Organic polymer containing anodes tend to contain a certain amount of uncombined dopant acid, such as toluene sulfonic acid. It has proven to be very difficult to reduce the level of these ionic contaminants to the degree that they do not result in resistivity depression of the reformation electrolyte; even when anodes are exposed to prolonged hot de-ionized water rinsing prior to the reform steps, some ionogens are released by the electrochemical action.

In a manufacturing environment, it is highly desirable to reduce the resistivity depression of the reformation electrolyte so as to avoid the necessity of frequent changes of the electrolyte. Traditionally, this problem has been addressed by the use of aqueous phosphoric acid solutions containing a substantial percentage of ethylene glycol. The glycol acts to raise the resistivity of the electrolyte for a given ionogen content and temperature. As the electrolyte becomes contaminated by ionogens from the solid impregnated anodes, the ethylene glycol content has been progressively increased in order to maintain the resistivity within specified limits. Thus the reformation electrolyte may be used for a significantly larger number of anodes prior to replacement, thereby facilitating greater manufacturing throughput per tank of reformation electrolyte.

SUMMARY OF THE INVENTION

It was discovered that reformation electrolytic solutions containing polyethylene glycol, polyethylene glycol monomethyl ether, and/or polyethylene glycol dimethyl ether in place of ethylene glycol are more resistant to resistivity depression than reformation electrolytes containing the same percentage of ethylene glycol. It also was discovered that reformation electrolytic solutions containing alkali metal phosphates are more resistant to resistivity depression by ionic contaminants than reformation electrolytic solutions containing phosphoric acid. Further, it was discovered that reformation electrolytic solutions containing both polyethylene glycol, polyethylene glycol monomethyl ether, and/or polyethylene glycol dimethyl ether and alkali metal phosphates demonstrate greater resistance to resistivity depression by ionic contaminants from solid impregnated capacitor anodes than with either material in combination with prior art organic (ethylene glycol) or ionic (phosphoric acid) constituents.

In accordance with the present invention, an impregnated electrolytic capacitor anode is treated by immersing an anode body in a liquid electrolytic solution and applying a voltage to the anode body, whereby a current flows through and repairs flaw sites in the anode body.

In one embodiment of the present invention, the liquid electrolytic solution includes an organic solvent comprising at least one of polyethylene glycol, polyethylene glycol monomethyl ether, and polyethylene glycol dimethyl ether.

According to another embodiment of the present invention, the liquid electrolytic solution includes an organic solvent and an alkali metal phosphate salt.

In a preferred embodiment of the invention, the electrolytic solution contains both an alkali metal phosphate salt and an organic solvent comprising at least one of polyethylene glycol, polyethylene glycol monomethyl ether, and polyethylene glycol dimethyl ether.

BRIEF DESCRIPTION OF THE DRAWINGS

The present invention will now be described in more detail with reference to preferred embodiments of the invention, given only by way of example, and illustrated in the accompanying drawings in which.

DETAILED DESCRIPTION OF THE INVENTION

Figure 1:
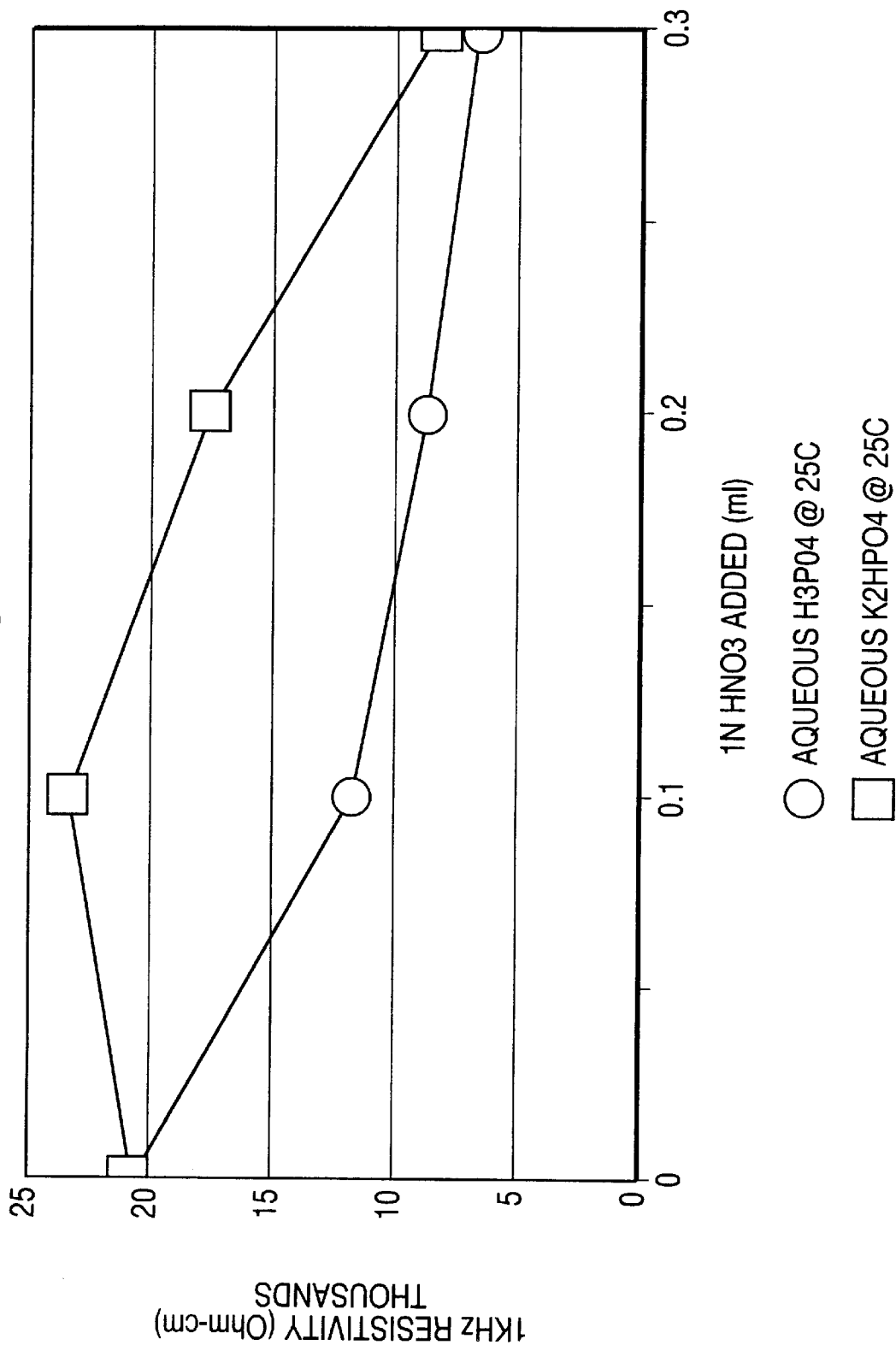
FIG. 1 compares resistivity of phosphoric acid and dibasic potassium phosphate, each in a solvent consisting of de-ionized water.
Figure 2:
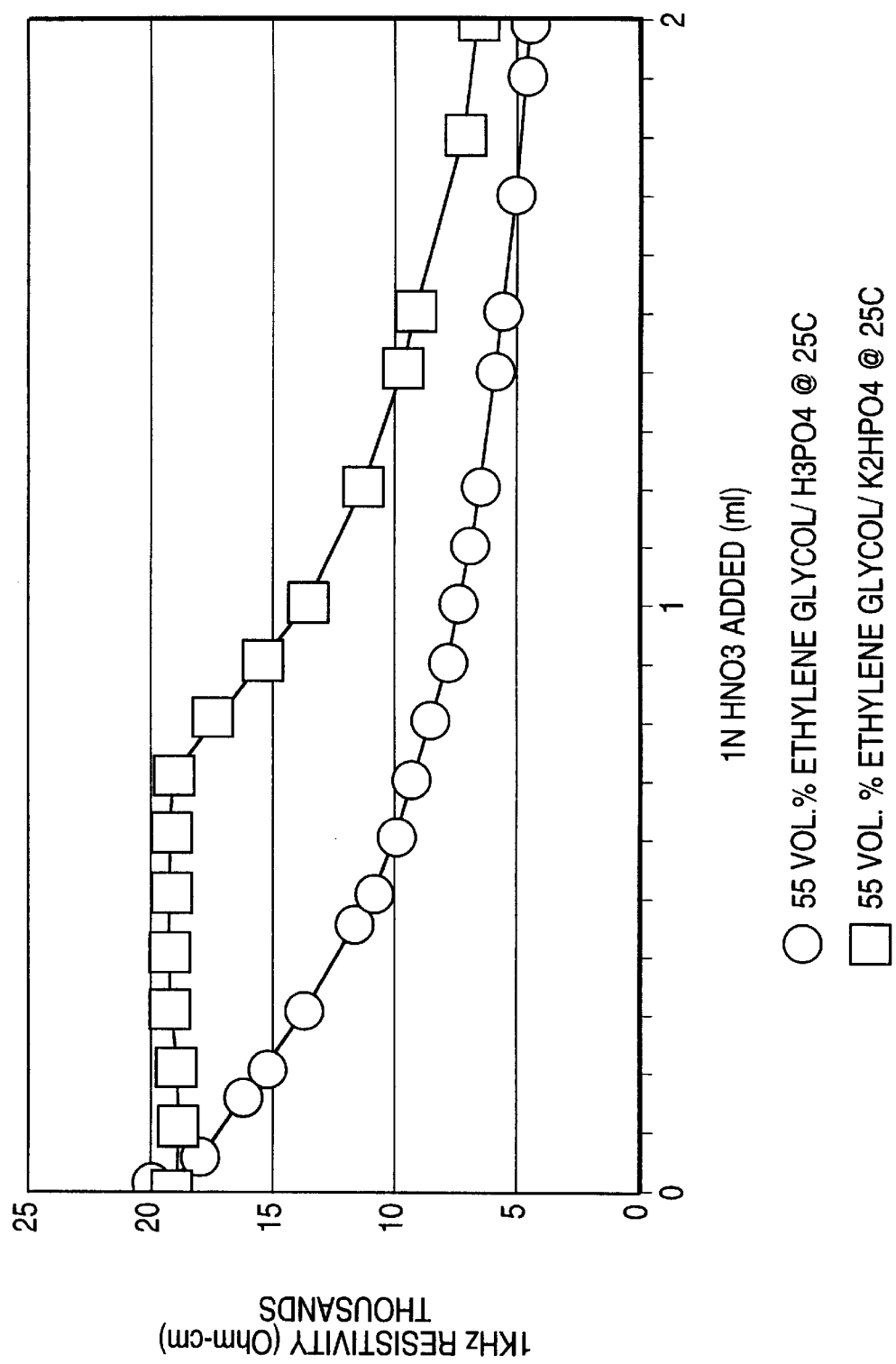
FIG. 2 compares resistivity of phosphoric acid and dibasic potassium phosphate, each in a solvent consisting of 55 volume % ethylene glycol plus de-ionized water.
Figure 3:
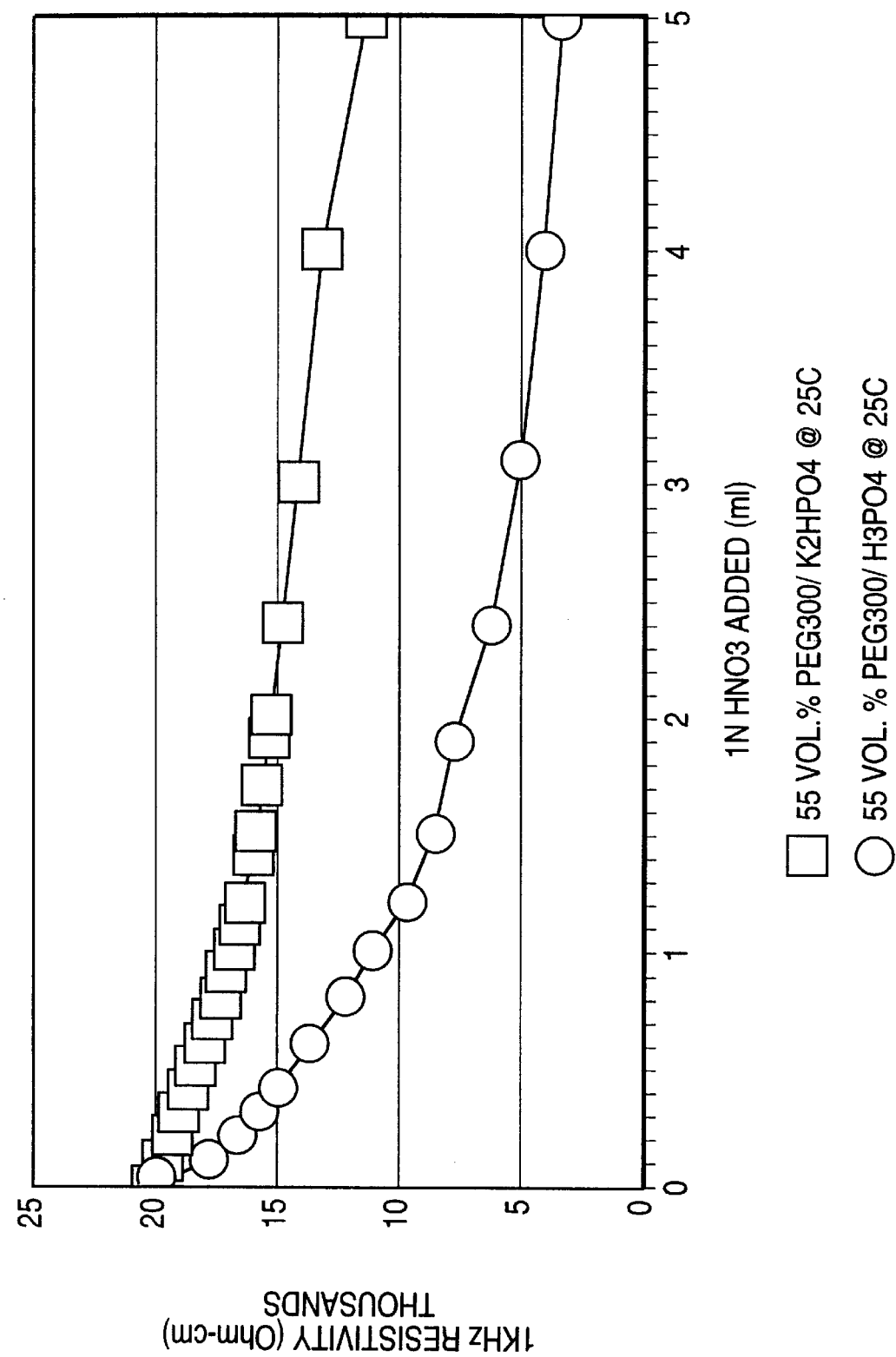
FIG. 3 compares resistivity of phosphoric acid and dibasic potassium phosphate, each in a solvent consisting of 55 volume % polyethylene glycol 300 plus de-ionized water.
Figure 4:
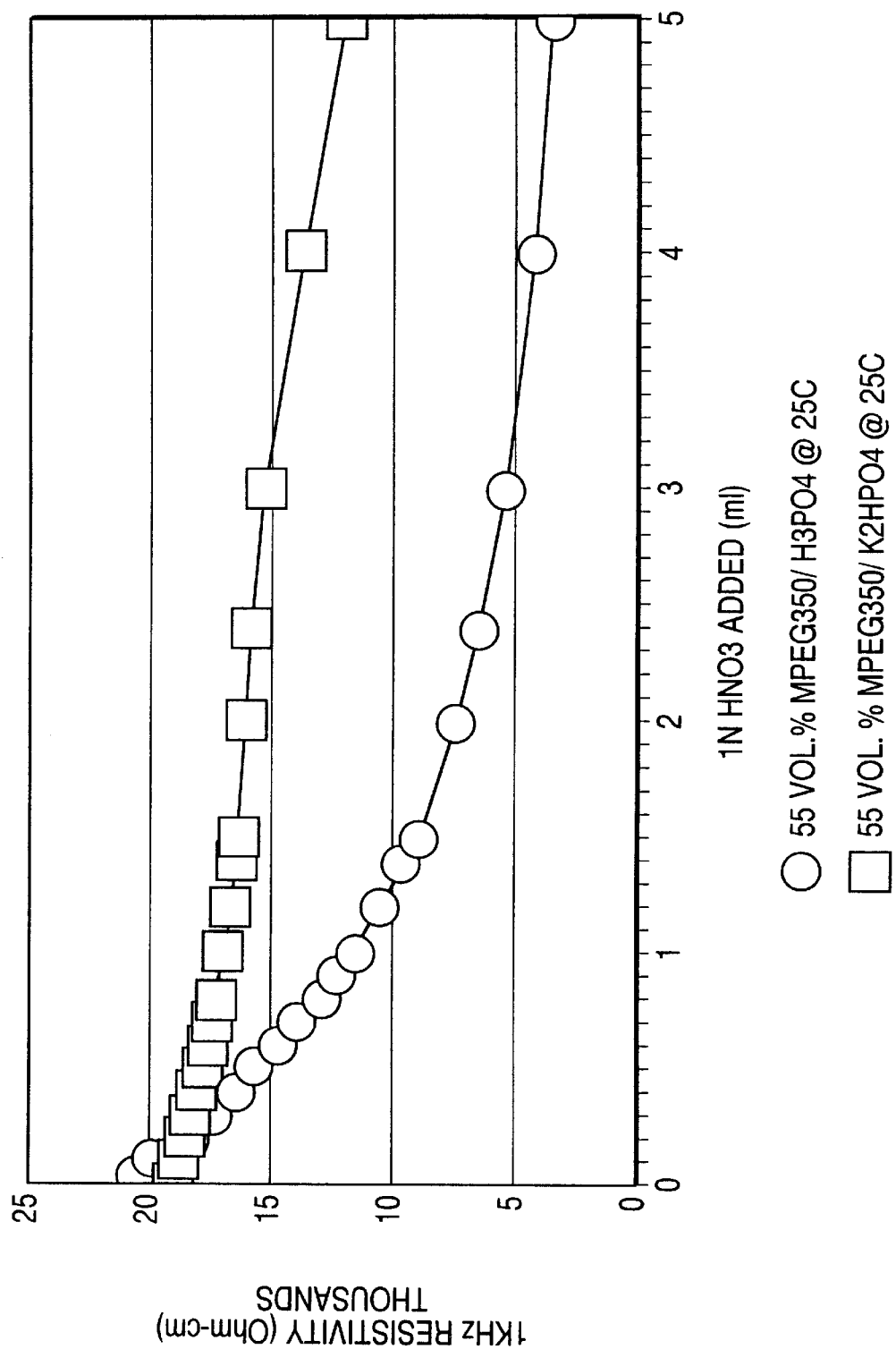
FIG. 4 compares resistivity of phosphoric acid and dibasic potassium phosphate, each in a solvent consisting of 55 volume % polyethylene glycol monomethyl ether 350 plus de-ionized water.
Figure 5:
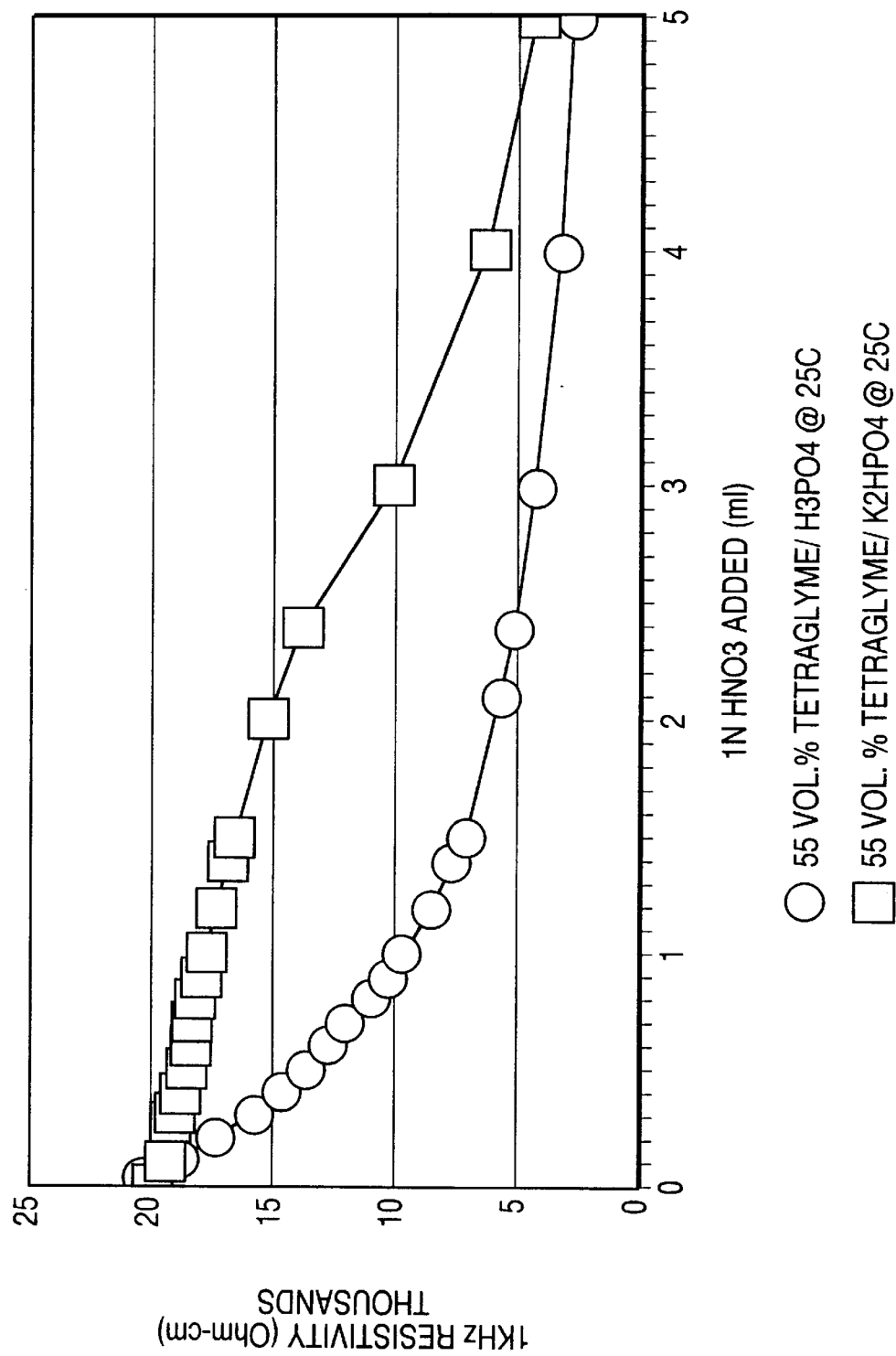
FIG. 5 compares resistivity of phosphoric acid and dibasic potassium phosphate, each in a solvent consisting of 55 volume % tetra ethylene glycol dimethyl ether plus de-ionized water.

In accordance with the present invention, an impregnated electrolytic capacitor anode is treated by immersing an anode body in a liquid electrolytic solution and applying a voltage to the anode body, whereby a current flows through and repairs flaw sites in the anode body. The voltage is usually applied in stepwise fashion, a few percent of the original anodizing voltage at a time, until an empirically determined optimum reform voltage is reached. The voltage is then held constant for a period of time while the current decays. The present invention provides greater resistance to change in resistivity with ionic (acidic) contamination during the reform process than prior art processes.

The reformation process according to a first embodiment of the present invention employs an electrolytic solution having an organic solvent which includes at least one organic solvent selected from polyethylene glycols, polyethylene glycol monomethyl ethers, or polyethylene dimethyl ethers.

The reformation process according to a second embodiment of the present invention employs an electrolytic solution having one or more alkali metal phosphate salts in combination with water and an organic solvent to give an alkaline or neutral electrolytic solution. The organic solvent may be any organic solvent that is typically used in this field such as ethylene glycol, glycerol, or propylene glycol. The alkali metal phosphate salt and organic solvent should be selected such that minimum resistivity change upon acid addition is achieved.

The reformation process according to the preferred embodiment of the present invention employs an electrolytic solution having one or more alkali metal phosphate salts and an organic solvent which includes at least one solvent selected from polyethylene glycols, polyethylene glycol monomethyl ethers, or polyethylene dimethyl ethers.

The amount of organic solvent should be less than the solubility limit of the organic solvent in water. Generally, the organic solvent is above about 1 vol % and less than about 95 vol % of the electrolytic solution. Preferably, the organic solvent is from about 5 vol % to about 75 vol % of the electrolytic solution. More preferably, the organic solvent is from about 5 vol % to about 55 vol % of the electrolytic solution.

The alkali metal phosphate salt preferably is a water soluble dibasic or tribasic salt, such as dibasic potassium phosphate and dibasic sodium phosphate, most preferably tribasic potassium phosphate. The amount of alkali metal phosphate salt is generally from about 0.01 wt % to about 10 wt % of the total weight of the electrolytic solution, preferably, from about 0.5 wt % to about 5 wt % of the total weight of the electrolytic solution, more preferably from about 0.5 wt % to about 2.5 wt % of the total weight of the electrolytic solution.

EXAMPLES

The following illustrative examples are provided for a better understanding of the invention. These examples are illustrative of preferred aspects of the invention and are not intended to limit the scope of the invention.

Example 1

In order to illustrate the superior resistivity depression resistance to contamination of "reformation" electrolytes containing alkali metal phosphates in place of phosphoric acid, a series "reformation" electrolytes was prepared employing solvents of the present invention as well as the traditional solvents, de-ionized water and aqueous ethylene glycol. For each solvent, two electrolytes were prepared: one containing phosphoric acid and the other containing dibasic potassium phosphate. All of these electrolytes were adjusted to a resistivity of approximately 20,000 ohm-cm at 25° C.±3° C. by varying the ionogen content. The resistivity of each electrolyte was measured vs. incremental additions of 1 normal nitric acid to 1 liter of electrolyte.

FIGS. 1–5 show that, in each case, the nitric acid addition-induced resistivity depression is lower for the dibasic potassium phosphate containing electrolyte than for its phosphoric acid-containing counterpart.

In manufacturing practice this enhanced resistivity depression resistance of the alkali metal phosphate-containing "reformation" electrolytes translates into the ability to absorb several times as much contamination from anodes being "reformed" before a minimum resistivity limit (e.g. 15,000 ohm-cm) is violated.

Example 2

The superior resistance to resistivity depression from contamination of the "reformation" electrolytes based upon the solvents of the present invention was determined by comparing the resistivity vs. nitric acid content of a series of electrolytes, each containing 55 volume % organic material in water. 1-liter samples of each electrolyte solvent were adjusted to a resistivity of approximately 20,000 ohm-cm at 25° C.±3° C. with phosphoric acid. Incremental amounts of 1N nitric acid were then added to each sample of "reformation" electrolyte while monitoring the resistivity.

Figure 6:
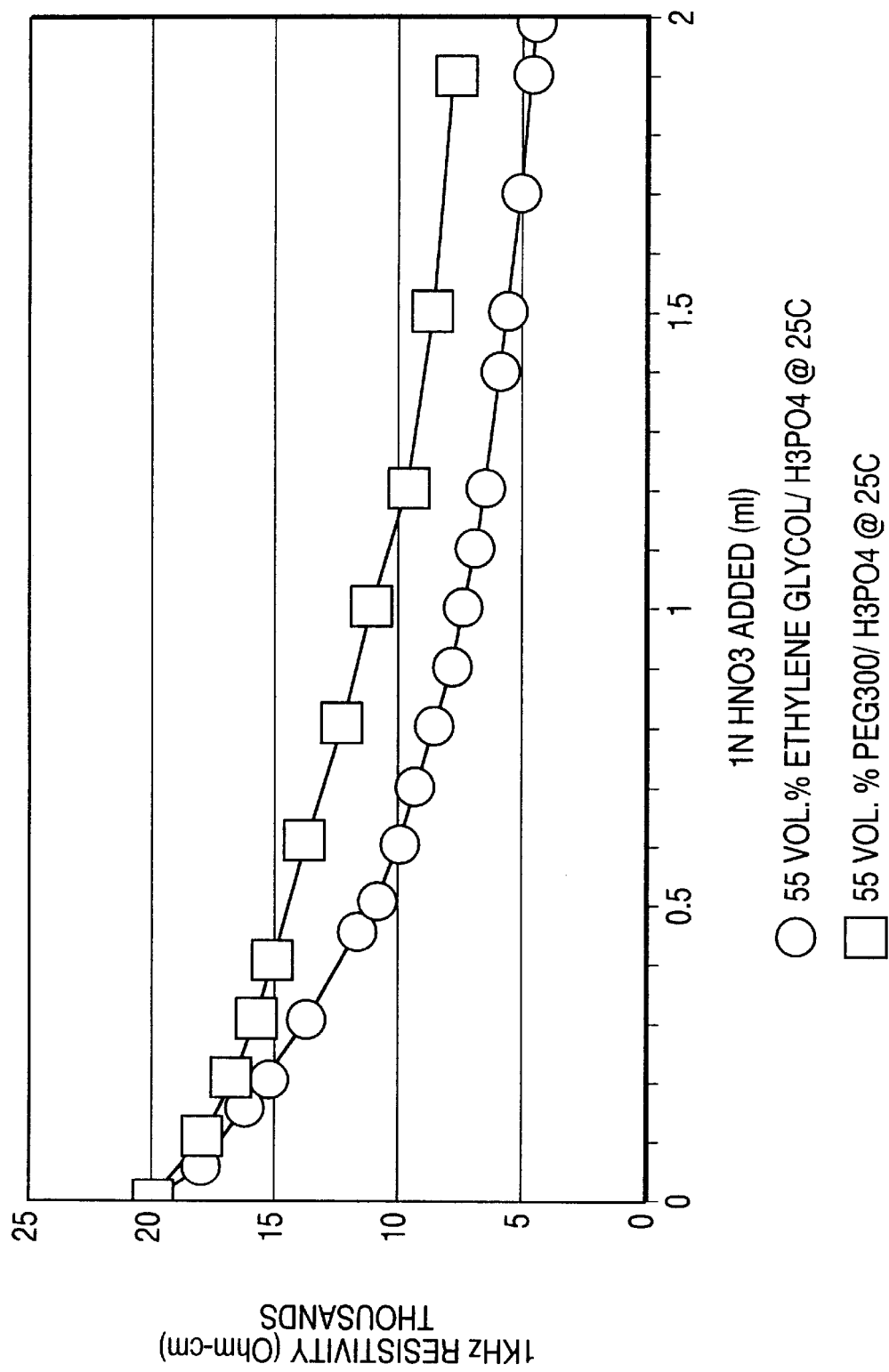
FIG. 6 compares resistivity of phosphoric acid in a solvent consisting of 55% polyethylene glycol 300 plus de-ionized water with phosphoric acid in a solvent consisting of 55 volume % ethylene glycol plus de-ionized water.
Figure 7:
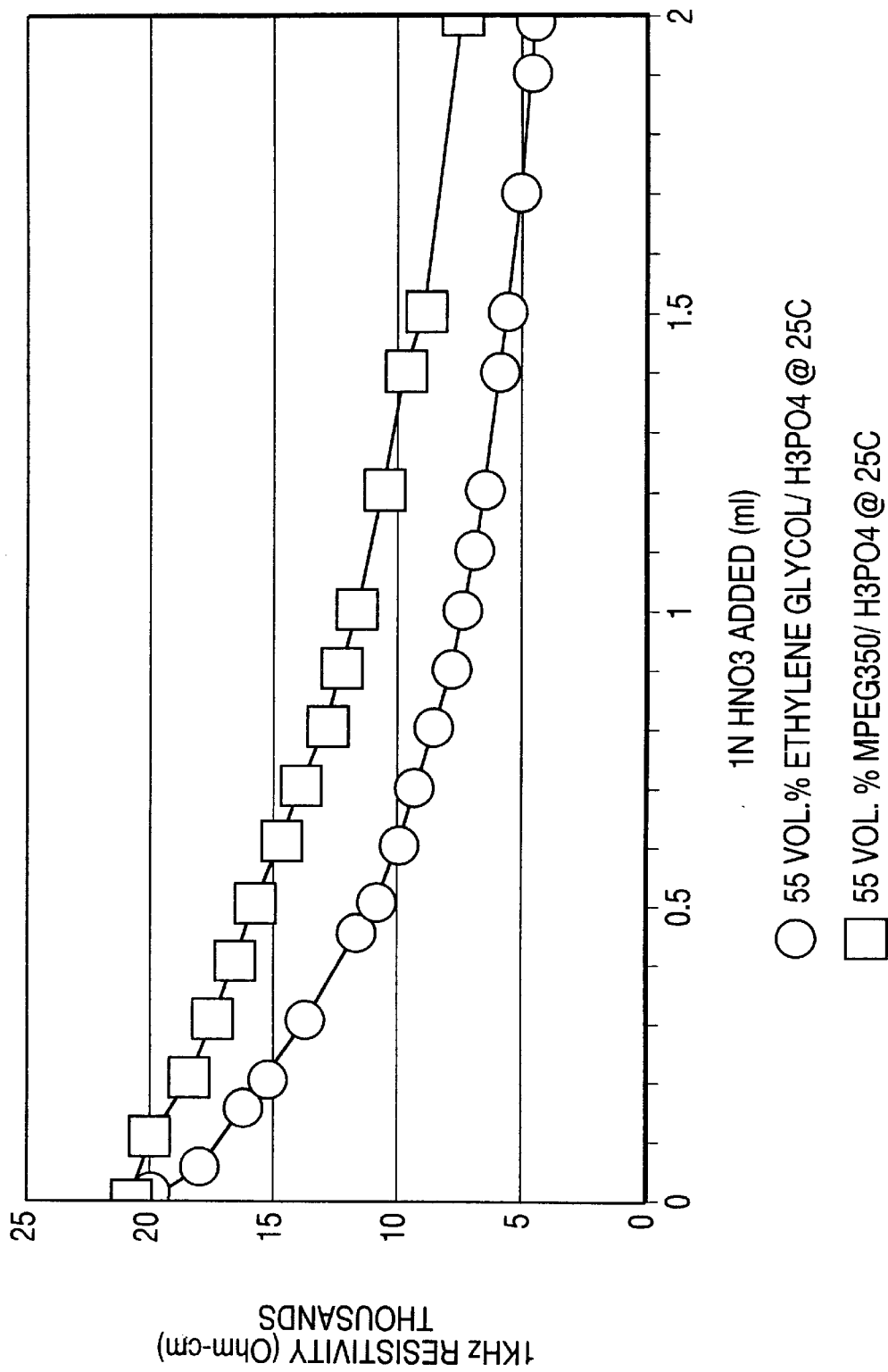
FIG. 7 compares resistivity of phosphoric acid in a solvent consisting of 55 volume % polyethylene glycol monomethyl ether 350 plus water with phosphoric acid a solvent consisting of 55 volume % ethylene glycol plus water.
Figure 8:
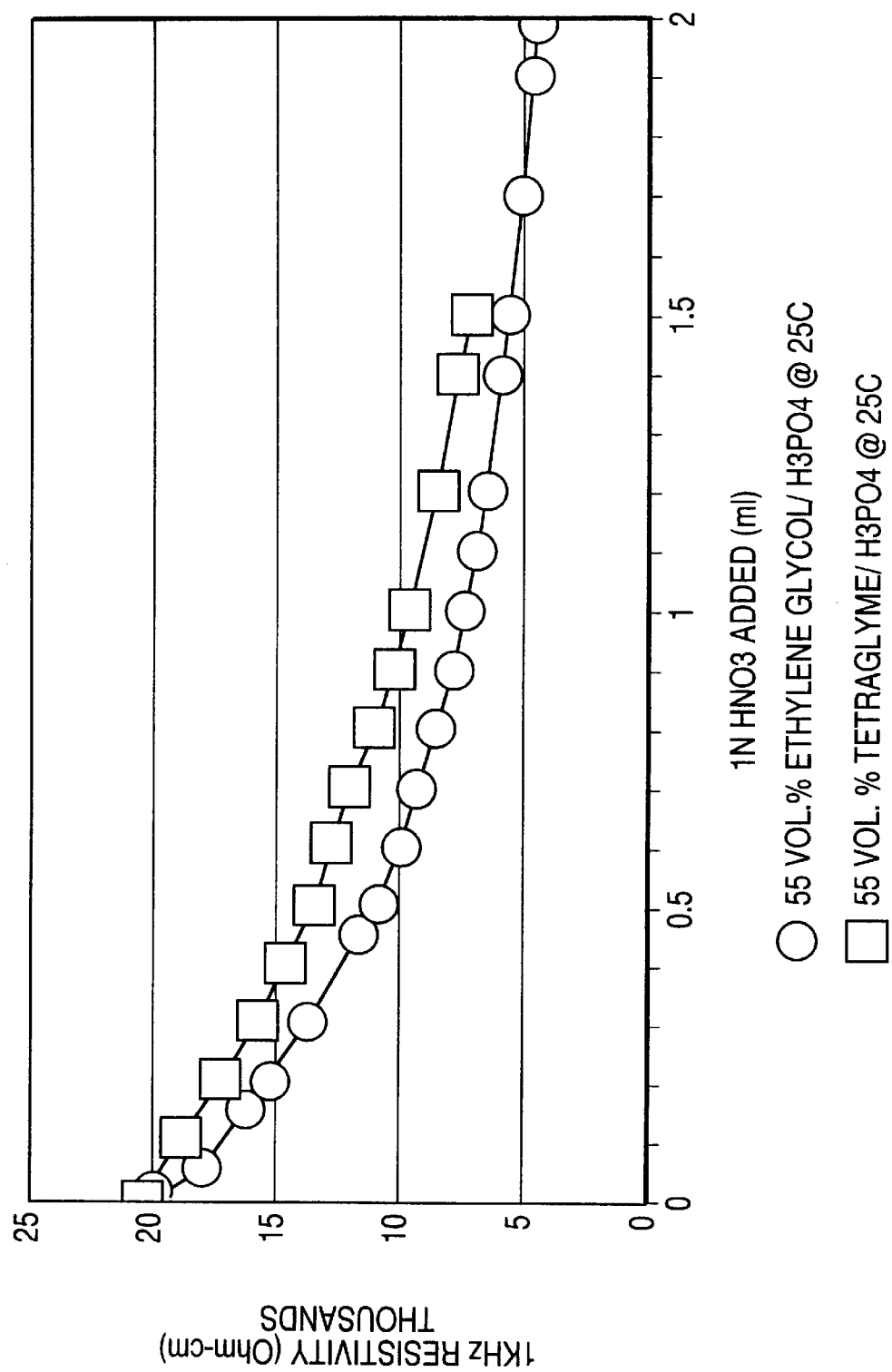
FIG. 8 compares resistivity of phosphoric acid in a solvent consisting of 55 volume % tetra ethylene glycol dimethyl ether plus water with phosphoric acid in a solvent consisting of 55 volume % ethylene glycol plus water.

FIGS. 6–8 show that in each case, the resistivity depression of the 55 volume % ethylene glycol electrolyte is greater at the same concentration of nitric acid than is found with the electrolytes containing the solvents of the present invention.

Example 3

The superior resistance to resistivity depression from contamination of "reformation" electrolytes based upon the solvents of the present invention was further determined with resistivity testing, as in Example 2, except that the ionogen used to prepare the electrolytes was dibasic potassium phosphate in place of phosphoric acid.

Figure 9:
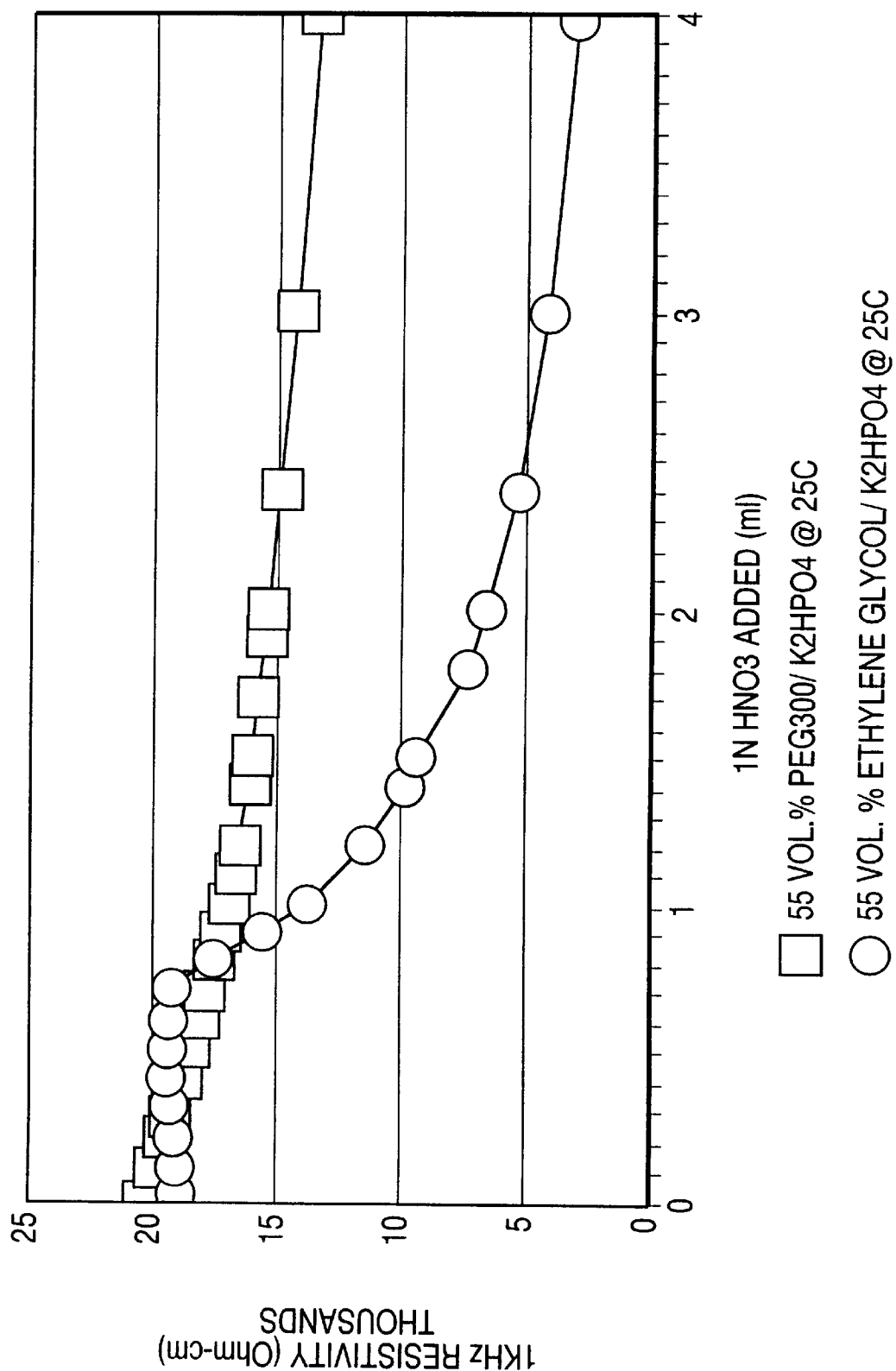
FIG. 9 compares resistivity of dibasic potassium phosphate in a solvent consisting of 55 volume % polyethylene glycol 300 plus water with dibasic potassium phosphate in a solvent consisting of 55 volume % ethylene glycol plus water.
Figure 10:
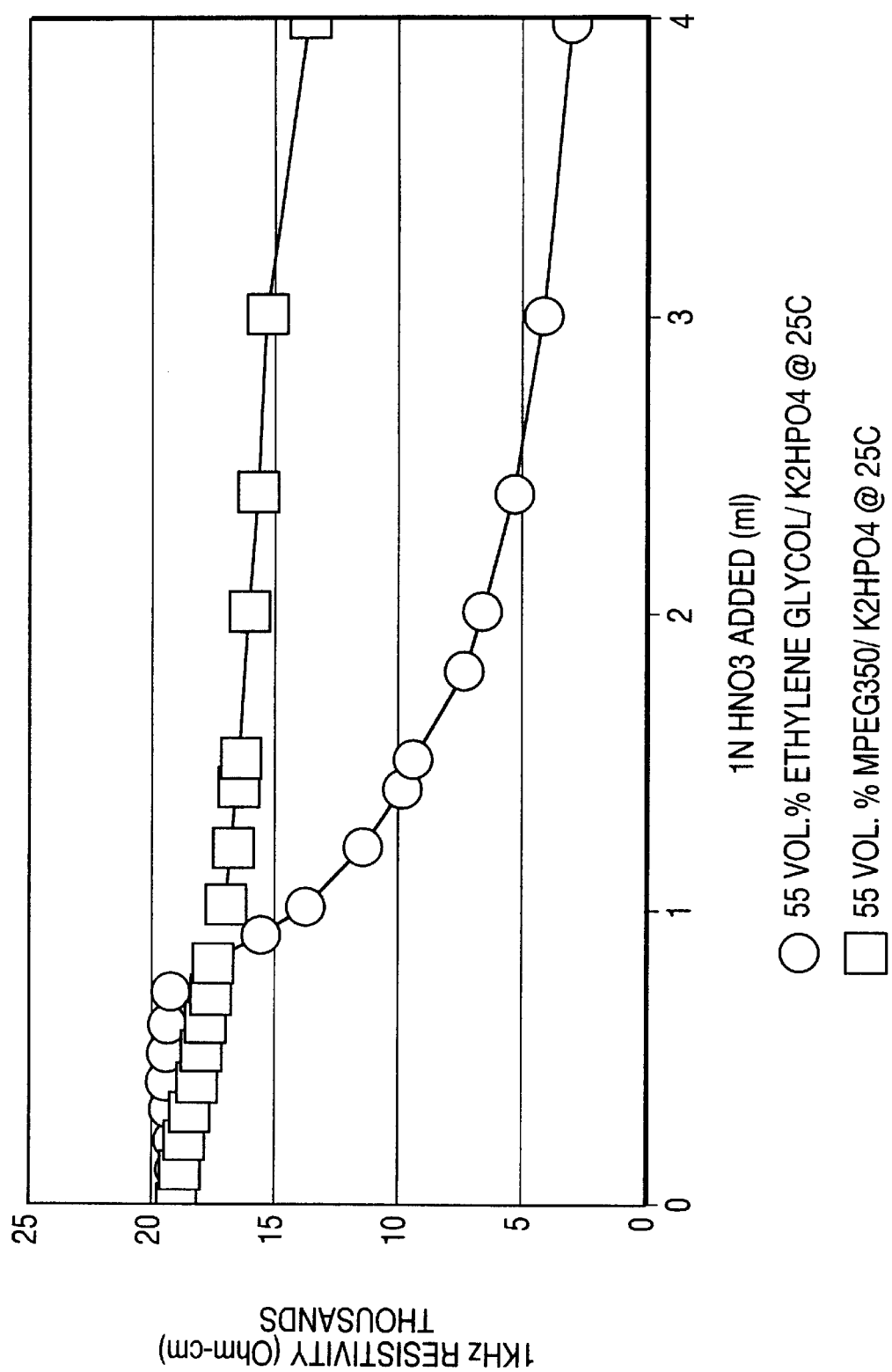
FIG. 10 compares resistivity of dibasic potassium phosphate in a solvent consisting of 55 volume % polyethylene glycol mono-methyl ether 350 plus water with dibasic potassium phosphate in a solvent consisting of 55 volume % ethylene glycol plus water.
Figure 11:
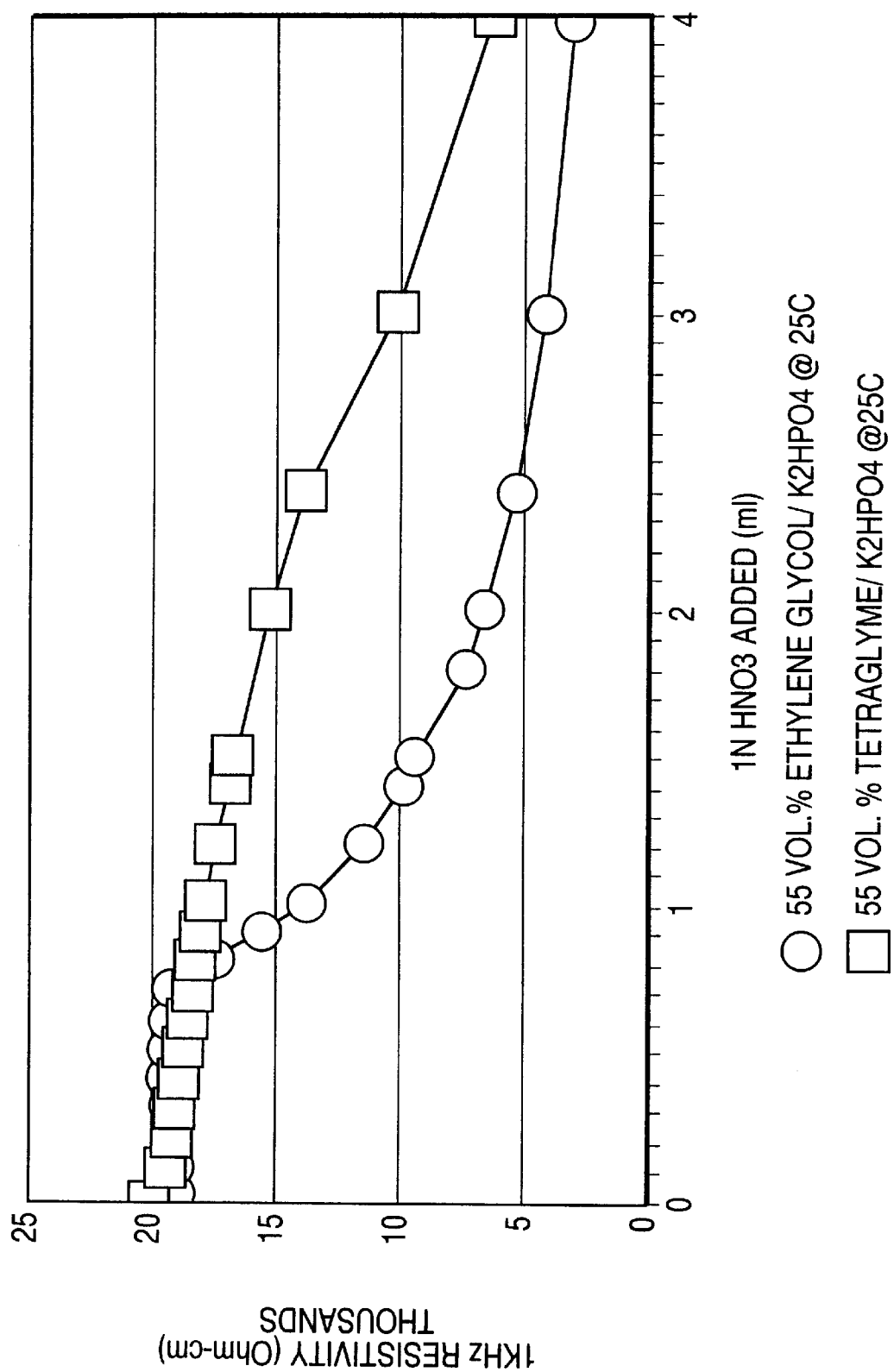
FIG. 11 compares resistivity of dibasic potassium phosphate in a solvent consisting of 55 volume % tetra ethylene glycol dimethyl ether plus water with dibasic potassium phosphate a solvent consisting of 55 volume % ethylene glycol plus water.

In each case, the resistivity depression vs. nitric acid content was less for the electrolyte of the present invention than for the 55 volume % ethylene glycol plus water electrolyte (see FIGS. 9–11), indicating the superior resistivity depression resistance of the electrolytes of the present invention.

Example 4

Sometimes it is desirable to conduct the "reformation" process at elevated temperature, e.g. at 80° C. In order to illustrate the superior elevated temperature resistance to resistivity depression of "reformation" electrolytes containing alkali metal phosphates in place of phosphoric acid, resistivity vs. incremental additions of 1 normal nitric acid was compared for 1 liter "reformation" electrolyte samples containing 55 volume % of organic plus water solvents and adjusted to approximately 10,000 ohm-cm. with an ionogen consisting of phosphoric acid or dibasic potassium phosphate.

Figure 12:
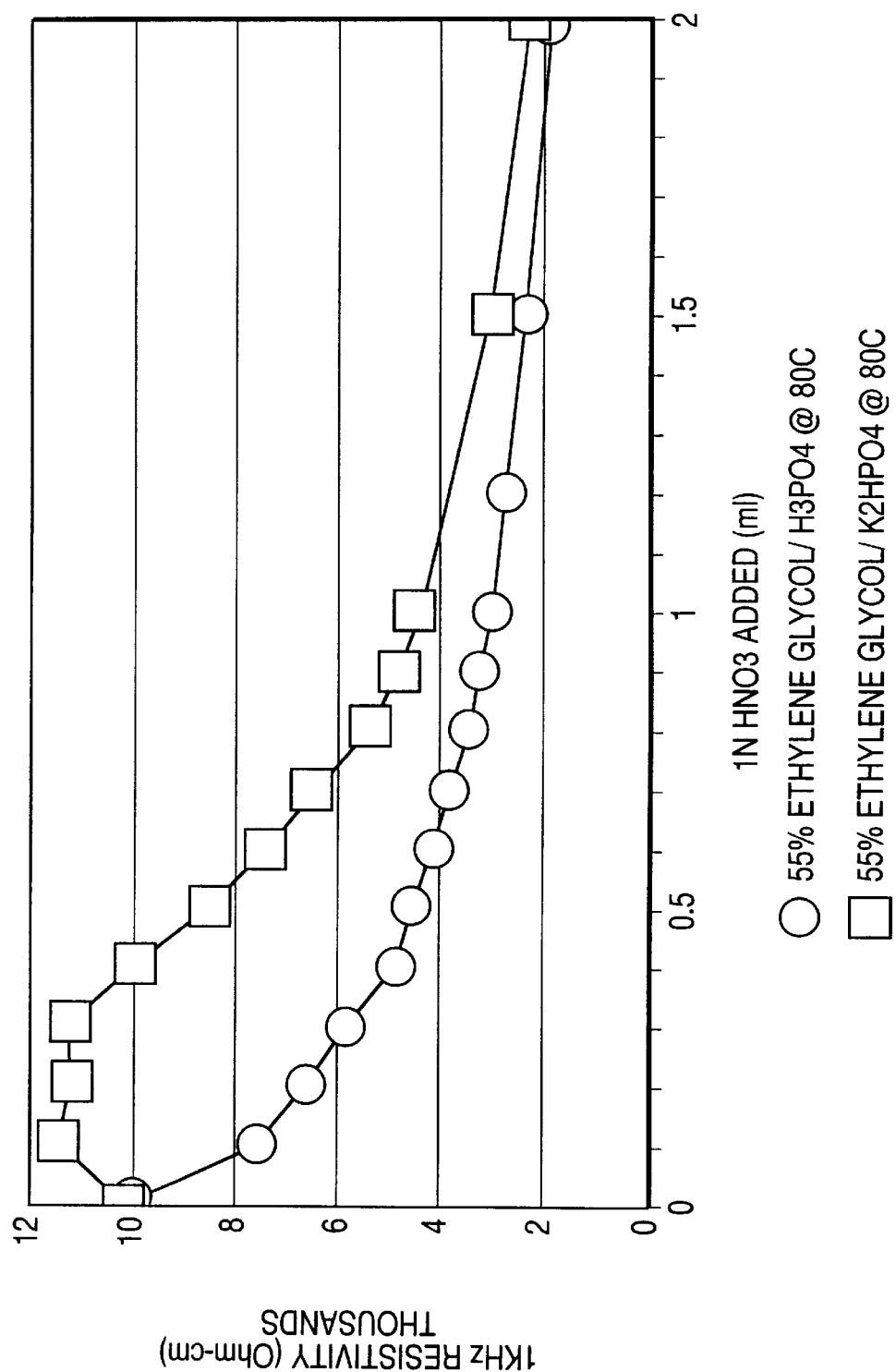
FIG. 12 shows the superior resistivity depression resistance of an electrolyte having a solvent consisting of 55 volume % ethylene glycol plus water and containing dibasic potassium phosphate vs. an electrolyte containing the same solvent and phosphoric acid, with both electrolytes tested at 80° C.
Figure 13:
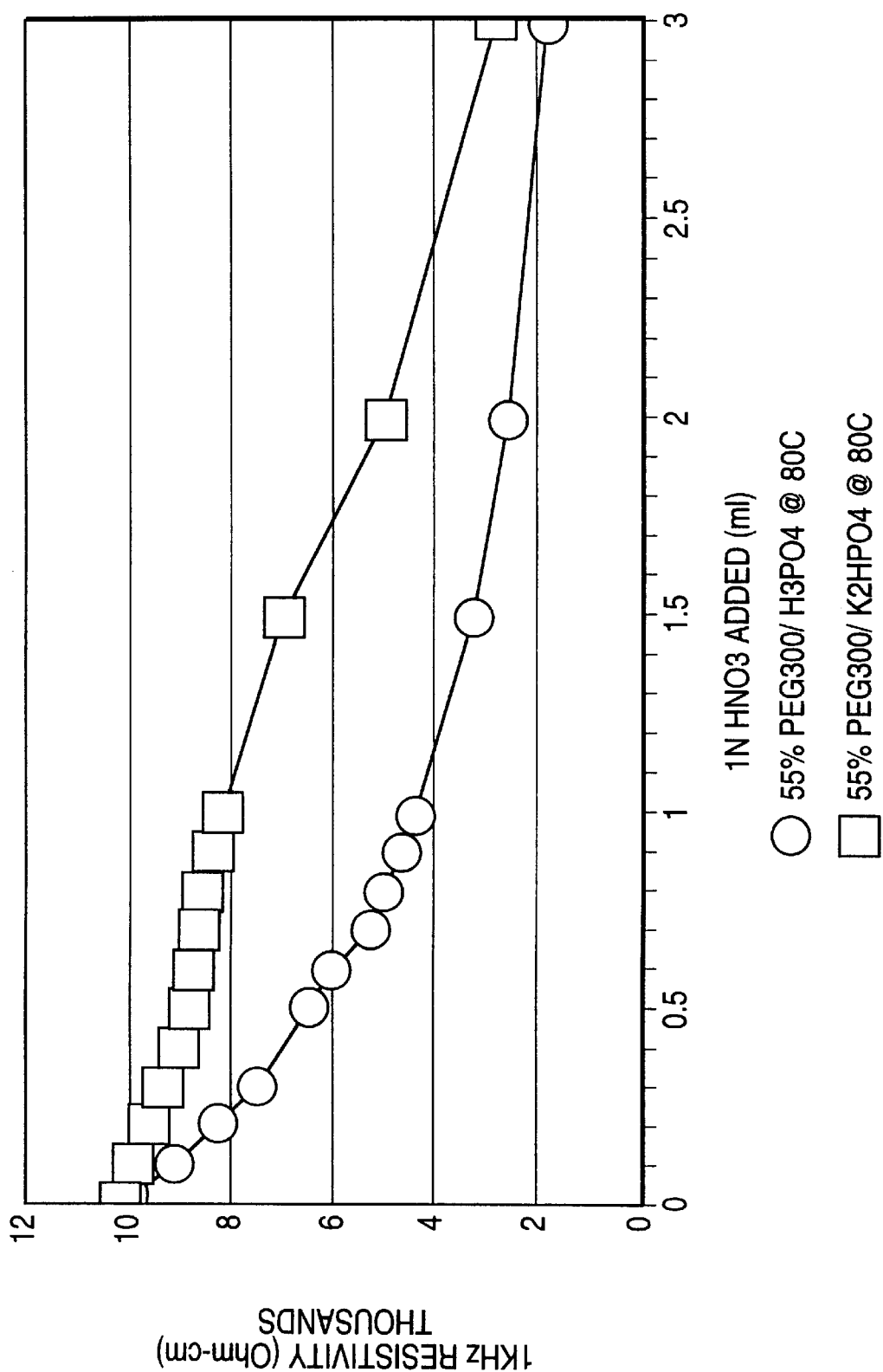
FIG. 13 shows the superior resistivity depression resistance of an electrolyte having a solvent consisting of 55 volume % polyethylene glycol 300 plus water and containing dibasic potassium phosphate vs. an electrolyte containing the same solvent and phosphoric acid, with both electrolytes tested at 80° C.

In both cases the electrolytes containing the alkali metal phosphate, dibasic potassium phosphate, exhibited greater resistivity depression resistance then the electrolytes containing phosphoric acid. See FIGS. 12 and 13.

Example 5

The superior elevated temperature resistance to resistivity depression by contamination of "reformation" electrolytes containing the solvents of the present invention was determined by preparing 1 liter samples of electrolyte solvents containing 55 volume % organic content plus water. The samples were then adjusted to a resistivity of approximately 10,000 ohm-cm at 80° C. with phosphoric acid or dibasic potassium phosphate. The resistivity of each "reformation" electrolyte was then measured vs. incremental additions of 1 normal nitric acid at 80° C.

Figure 14:
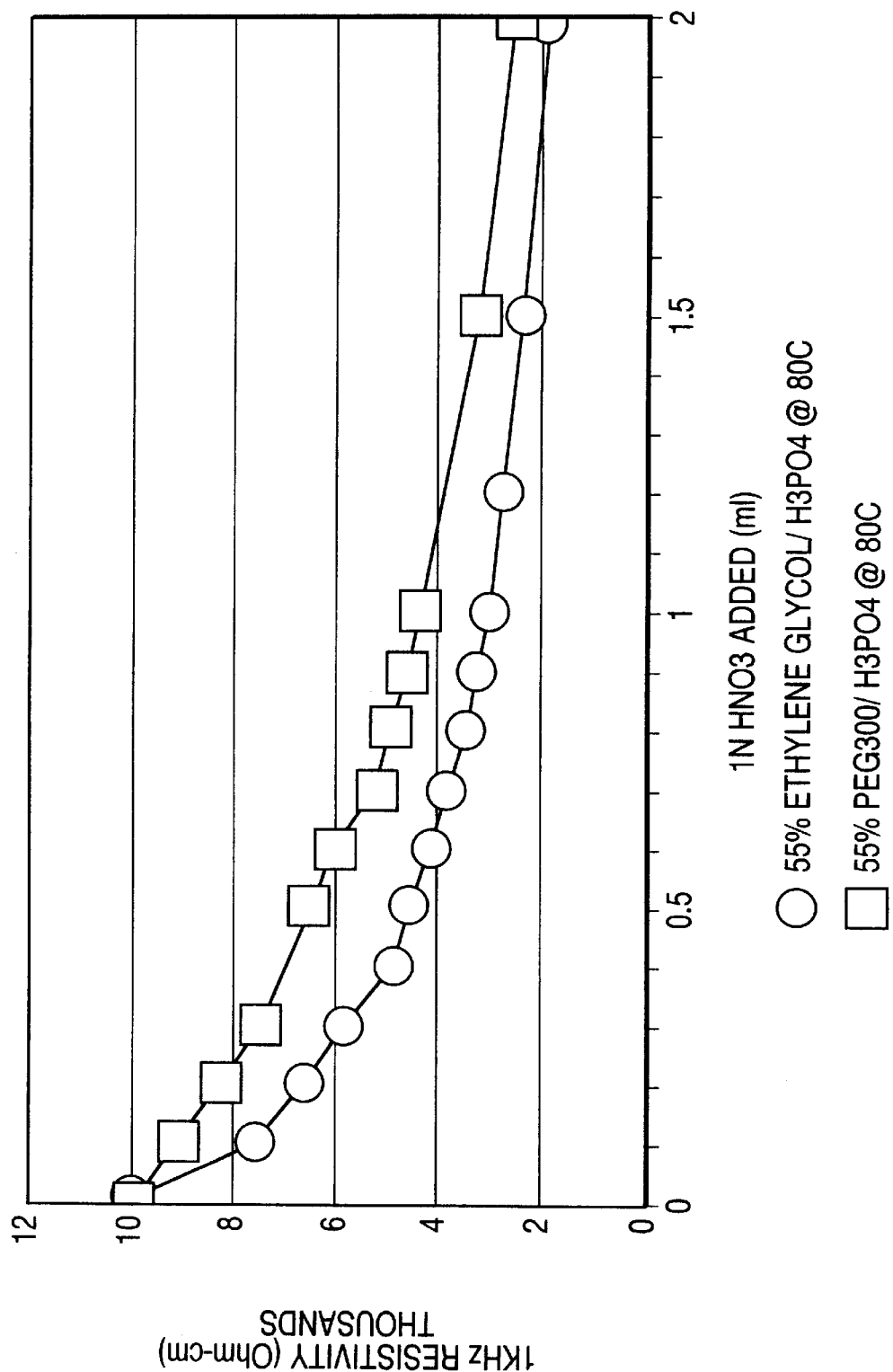
FIG. 14 shows the resistivity vs. nitric acid content of a 55 volume % ethylene glycol plus water electrolyte containing phosphoric acid vs. a 55 volume % polyethylene glycol plus water electrolyte containing phosphoric acid.
Figure 15:
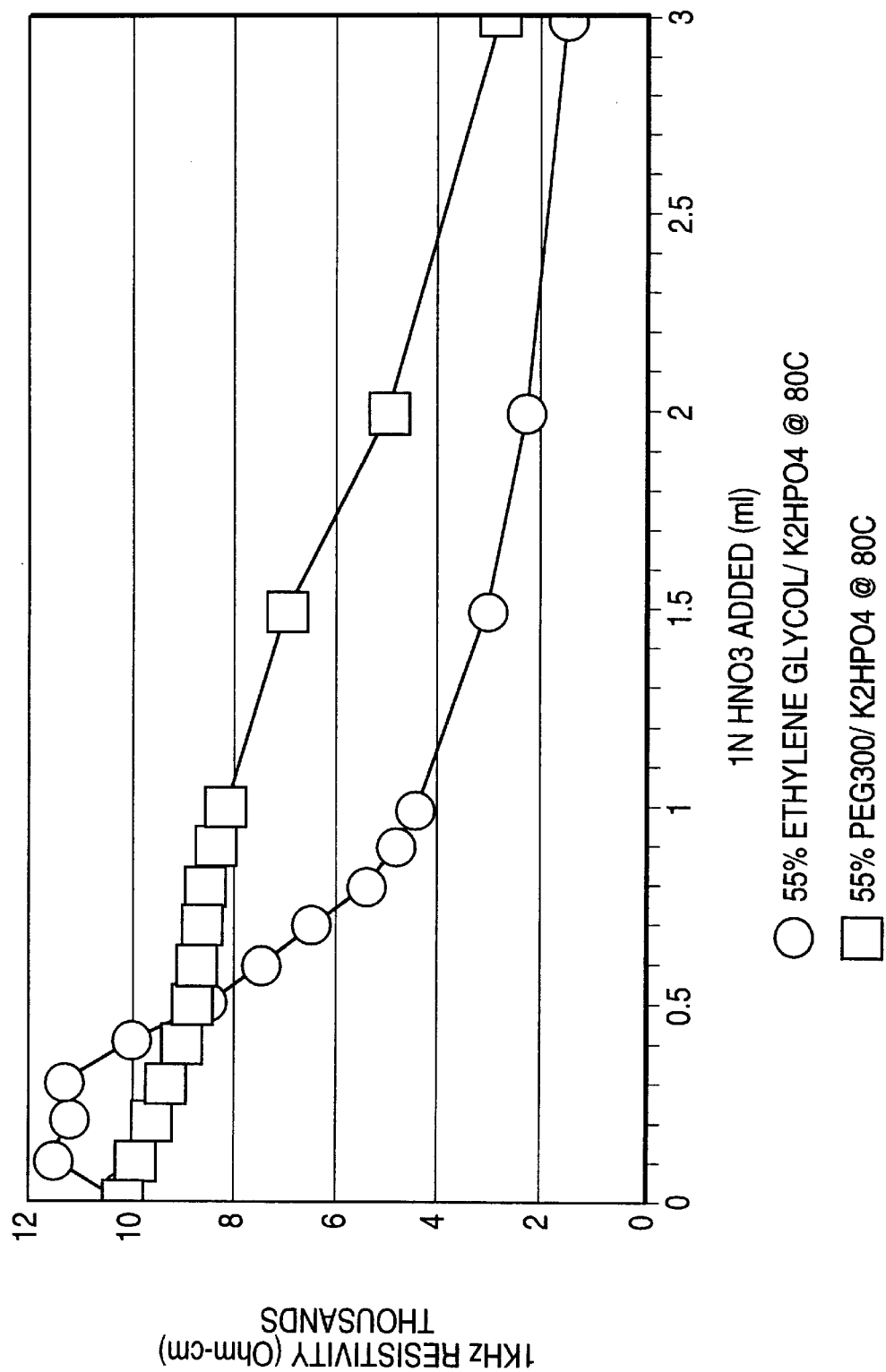
FIG. 15 shows the resistivity vs. nitric acid content of a 55 volume % ethylene glycol plus water electrolyte containing dibasic potassium phosphate vs. a 55 volume % polyethylene glycol 300 plus water electrolyte containing dibasic potassium phosphate.

For both phosphoric acid and dibasic potassium phosphate ionogens at 80° C., the electrolytes containing a solvent of the present invention (i.e., aqueous polyethylene glycol) proved to be more resistant to resistivity depression over a broad range of acid additions than electrolytes containing a conventional solvent (i.e., aqueous ethylene glycol) having the same volume % organic content. See FIGS. 14 and 15.

Example 6

It was found that alkali metal phosphates other than dibasic potassium phosphate are also useful in the formulation of "reformation" electrolytes having superior resistance to resistivity depression by contamination when compared with "reformation" electrolytes containing phosphoric acid as the ionogen.

Figure 16:
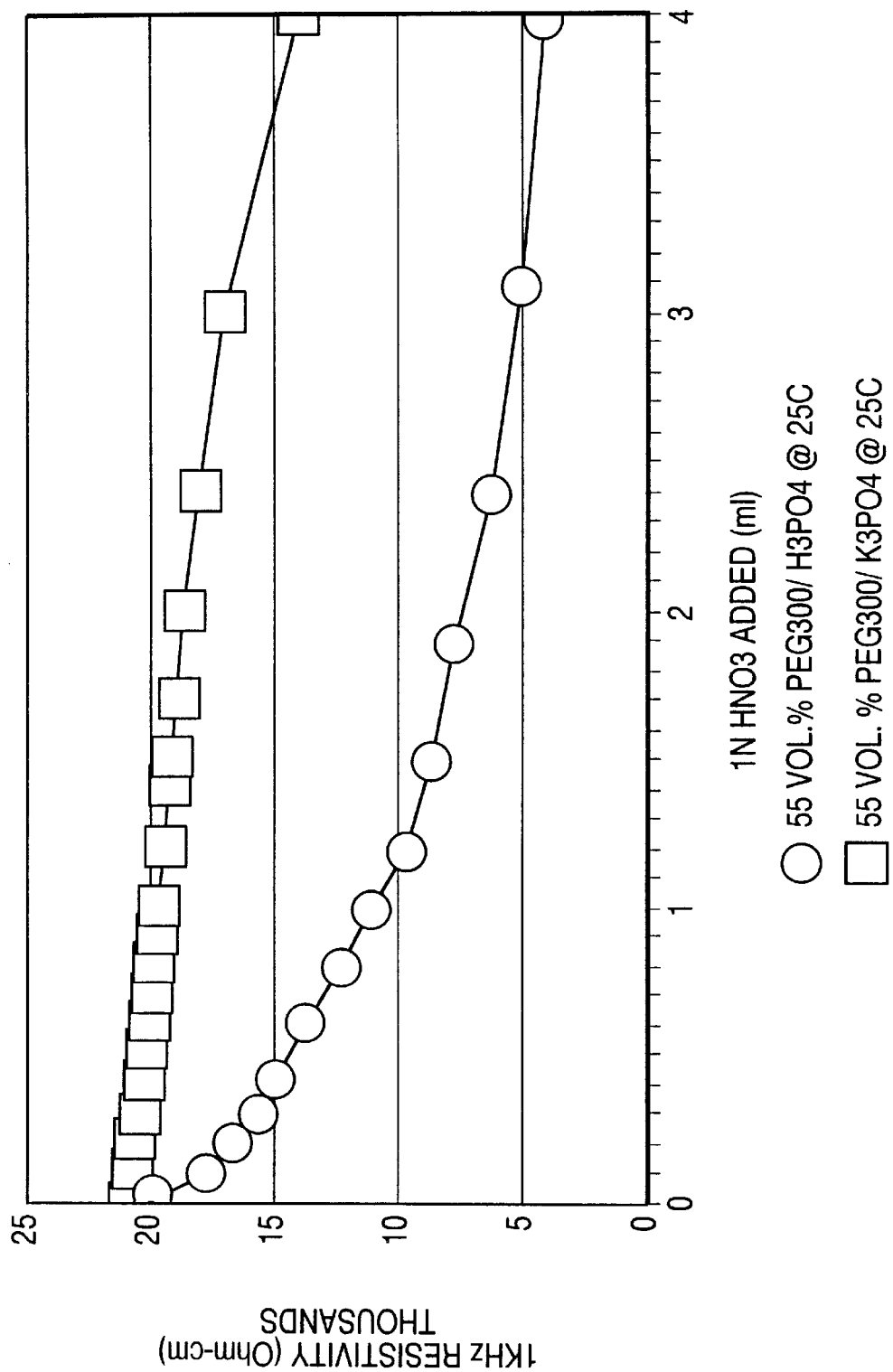
FIG. 16 shows the resistivity depression vs. incremental 1 normal nitric acid additions for two reformation electrolytes having a solvent consisting of 55 volume % polyethylene glycol 300 plus water.

FIG. 16 shows the resistivity depression vs. incremental 1 normal nitric acid additions for two "reformation" electrolytes having a solvent consisting of 55 volume % polyethylene glycol 300 plus water. One electrolyte was adjusted to approximately 20,000 ohm-cm with phosphoric acid, while the other was adjusted to approximately 20,000 ohm-cm with tribasic potassium phosphate, both at 25° C.+/−3° C.

The resistivity vs. acid addition curves indicate that many times as much nitric acid is required to depress the resistivity of the tribasic potassium phosphate containing electrolyte to an arbitrary minimum resistivity (e.g., 15,000 ohm-cm) as is required to depress the resistivity of the phosphoric acid containing electrolyte to the same resistivity.

Example 7

Figure 17:
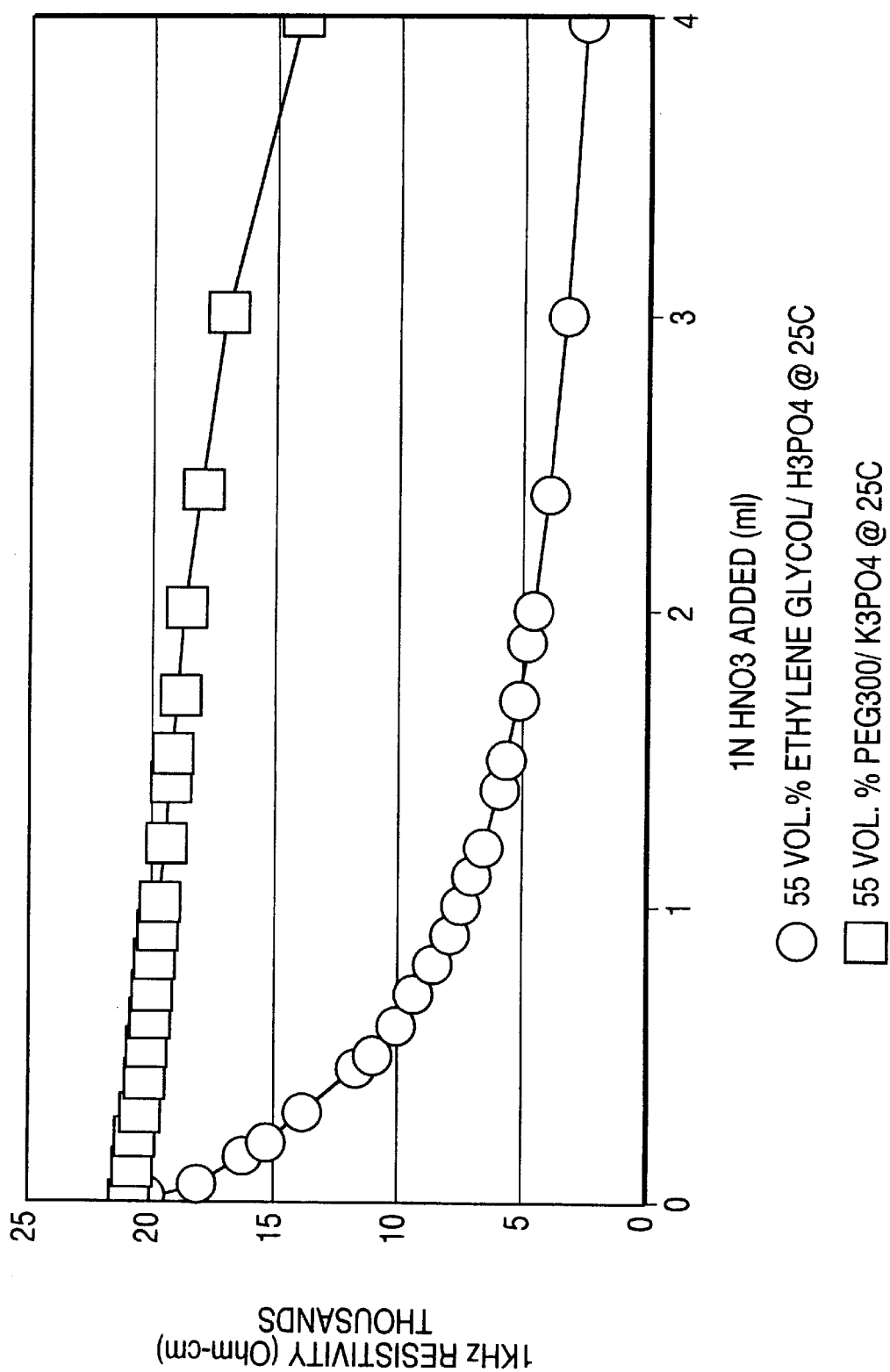
FIG. 17 shows the resistivity (25° C.) vs. incremental 1 normal nitric acid additions to 1 liter samples of a 55 volume % ethylene glycol plus water electrolyte and phosphoric acid and a 55 volume % polyethylene glycol 300 electrolyte containing and tribasic potassium phosphate.

In order to illustrate the great improvement over prior art of the solvents and ionogens of the present invention in the preparation of "reformation" electrolytes which are resistant to resistivity depression by contamination, a 55 volume % ethylene glycol plus water electrolyte containing a sufficient quantity of phosphoric acid to yield a 25° C.+/−3° C. resistivity of 20,000 ohm-cm was compared with a 55 volume % polyethylene glycol 300 electrolyte containing sufficient tribasic potassium phosphate to yield 25° C.+/−3° C. resistivity of 20,000 ohm-cm. See FIG. 17.

The amount of nitric acid required to depress the electrolyte resistivity to an arbitrary minimum (e.g., 15,000 ohm-cm) is many times higher for the "reformation" electrolyte containing aqueous polyethylene glycol 300 plus tribasic potassium phosphate than for the prior art electrolyte containing aqueous ethylene glycol plus phosphoric acid.

Example 8

Due to the large resistivity depression vs. amount of contamination observed for prior art "reformation" electrolytes, capacitor manufacturers have been forced to disregard used "reformation" electrolyte frequently or to resort to a progressive increase in the organic content of the electrolyte in order to maintain the resistivity above a predetermined minimum value (usually determined empirically by part performance).

The use of increased organic content to maintain a minimum resistivity is illustrated in Table 1, which depicts the resistivity versus ethylene glycol content for a 20,000 ohm-cm/25° C. prior art "reformation" electrolyte containing 55 volume % aqueous ethylene glycol and phosphoric acid and to 1 liter of which has been added 1.0 ml of 1 normal nitric acid.

TABLE 1

| Resistivity Versus Ethylene Glycol Content | | | |
|---|---|---|---|
| 0.1N HNO$_3$ Added (ml) | Ethylene Glycol Added (ml) | Ethylene Glycol (% by volume) | 1 KHz Resistivity (Ohm-cm), 25 C |
| 0 | 0 | 55 | 20,000 |
| 1 | 0 | 55 | 7,240 |
| 1 | 100 | 59 | 9,670 |
| 1 | 200 | 62.5 | 12,000 |
| 1 | 300 | 65.3 | 14,600 |
| 1 | 320 | 65.9 | 15,200 |

Table 1 shows that 320 ml of ethylene glycol was added before the resistivity increased to an arbitrary minimum of approximately 15,000 ohm-cm, giving a 65.9 volume % ethylene glycol containing "reformation" electrolyte. This is not only wasteful of the organic, but is difficult to carry-out with "reformation" electrolytes operated near room temperature due to the low evaporation rate of the water component of the electrolyte (without evaporation the change to a 65.9 volume % ethylene glycol solution, above, involves an increase in electrolyte volume of 32%).

By contrast, a "reformation" electrolyte containing 55 volume % aqueous polyethylene glycol 300 and adjusted to a 25° C. resistivity of approximately 20,000 ohm-cm with dibasic potassium phosphate exhibits a resistivity in excess of 15,000 ohm-cm/25° C. after the addition of 1 ml of 1 normal nitric acid to 1 liter of this electrolyte. Thus a large savings in time required to empty/adjust "reformation" tanks and a large savings in chemicals as well as a more uniform organic/water ratio may be realized through the use of the solvents and ionogens of the present invention.

Example 9

In order to demonstrate the efficacy of the electrolytes and process of the present invention, a batch of sintered, anodized tantalum anodes was split into 3 groups. All 3 groups were impregnated with manganese dioxide via wetting the anodes with manganese nitrate, followed by pyrolysis at approximately 260° C. in an oven having live steam injection as is common to the industry. Multiple wetting and pyrolysis cycles were used to produce the desired manganese dioxide coating thickness.

The batch of anodes was split into 3 groups for a "reformation" step after approximately half of the impregnation process and, then, at the end of the impregnation process (i.e., after the completion of the manganese oxide coating process). During the "reformation" process, the anodes were immersed in a "reformation" electrolyte and voltage was applied step-wise until approximately 55% of the anodizing voltage was reached.

The anodes were then rinsed in de-ionized water, dipped in a graphite suspension, and coated with a silver paint to produce finished (but unencapsulated) capacitor anodes.

The electrical performance for the group of anodes "reformed" in a traditional electrolyte containing aqueous ethylene glycol and phosphoric acid and for groups "reformed" at 30° C. and 80° C. in electrolytes of the present invention containing polyethylene glycol 300 and dibasic potassium phosphate is presented in Table 2.

TABLE 2

Polyethylene Glycol and Dibasic Potassium Phosphate Performance

| Electrolyte Type, Temp | Cap ($\mu$F) | DF (%) | ESR (ohms) | Leakage ($\mu$A) |
| --- | --- | --- | --- | --- |
| Ethylene Glycol / $H_3PO_4$, 80° C. | 22.13 | 2.24 | 0.320 | 0.138 |
| PEG 300 / $K_2HPO_4$, 30° C. | 21.90 | 2.23 | 0.298 | 0.109 |
| PEG 300 / $K_2HPO_4$, 80° C. | 21.92 | 2.22 | 0.292 | 0.089 |

At both 30° C. and 80° C., the electrolyte/process of the present invention, which was shown above to be more resistant to contamination with respect to resistivity depression, is seen to give results equivalent to conventional "reform" electrolyte/process.

It will be apparent to those skilled in the art that various modifications and variations can be made in the compositions and methods of the present invention without departing from the spirit or scope of the invention. Thus, it is intended that the present invention cover the modifications and variations of this invention provided they come within the scope of the appended claims and their equivalents.

What is claimed is:

1. A process for treating a solid impregnated electrolytic capacitor anode body by immersing the anode body in a liquid electrolytic solution and applying a voltage to the anode body, wherein a current flows through and repairs flaw sites in the anode body, the process comprising:
   immersing the anode body in a liquid electrolytic solution having an organic solvent, said organic solvent comprising at least one of polyethylene glycol, polyethylene glycol monomethyl ether, and polyethylene glycol dimethyl ether;
   applying a positive voltage to said anode body; and
   applying a negative voltage to said liquid electrolytic solution.

2. The process of claim 1 wherein the total volume of the organic solvent is greater than about 1% and less than about 95% of the total volume of the electrolytic solution.

3. The process of claim 1 wherein the total volume of the organic solvent is from about 5% to about 75% of the total volume of the electrolytic solution.

4. The process of claim 1 wherein the total volume of the organic solvent is from about 5% to about 55% of the total volume of the electrolytic solution.

5. A process for treating a solid impregnated electrolytic capacitor anode body by immersing the anode body in a liquid electrolytic solution and applying a voltage to the anode body, wherein a current flows through and repairs flaw sites in the anode body, the process comprising:
   immersing the anode body in a liquid electrolytic solution comprising a partially organic solvent and at least one alkali metal phosphate salt;
   applying a positive voltage to said anode body; and
   applying a negative voltage to said electrolytic solution.

6. The process of claim 5 wherein said organic solvent comprises at least one of propylene glycol, glycerol, and ethylene glycol.

7. The process of claim 5 wherein said organic solvent comprises at least one of polyethylene glycol, polyethylene glycol monomethyl ether, and polyethylene glycol dimethyl ether.

8. The process of claim 5 wherein the alkali metal phosphate salt is dibasic potassium phosphate or dibasic sodium phosphate.

9. The process of claim 5 wherein the alkali metal phosphate salt is tribasic potassium phosphate.

10. The process of claim 5 wherein the total weight of the alkali metal phosphate salt is from about 0.01% to about 10% of the total weight of the electrolytic solution.

11. The process of claim 5 wherein the total weight of the alkali metal phosphate salt is from about 0.5% to about 5% of the total weight of the electrolytic solution.

12. The process claim 5 wherein the total weight of the alkali metal phosphate salt is from about 0.5% to about 2.5% of the total weight of the electrolytic solution.

13. The process of claim 5 wherein the total volume of the organic solvent is greater than about 1% and less than about 95% of the total volume of the electrolytic solution.

14. The process of claim 5 wherein the total volume of the organic solvent is from about 5% to about 75% of the total volume of the electrolytic solution.

15. The process of claim 5 wherein the total volume of the organic solvent is from about 5% to about 55% of the total volume of the electrolytic solution.

16. A process for treating a solid impregnated electrolytic capacitor anode body by immersing the anode body in a liquid electrolytic solution and applying a voltage to the anode body, wherein a current flows through and repairs flaw sites in the anode body, the process comprising:
   immersing the anode body in a liquid electrolytic solution comprising an organic solvent and tribasic potassium phosphate, said organic solvent comprising at least one of polyethylene glycol, polyethylene glycol monomethyl ether, and polyethylene glycol dimethyl ether;
   applying a positive voltage to said anode body; and
   applying a negative voltage to said liquid electrolytic solution;
   wherein the total volume of the organic solvent is from about 5% to about 75% of the total volume of the electrolytic solution; and
   wherein the total weight of tribasic potassium phosphate is from about 0.1% to about 5% of the total weight of the electrolytic solution.

* * * * *